2,228,568

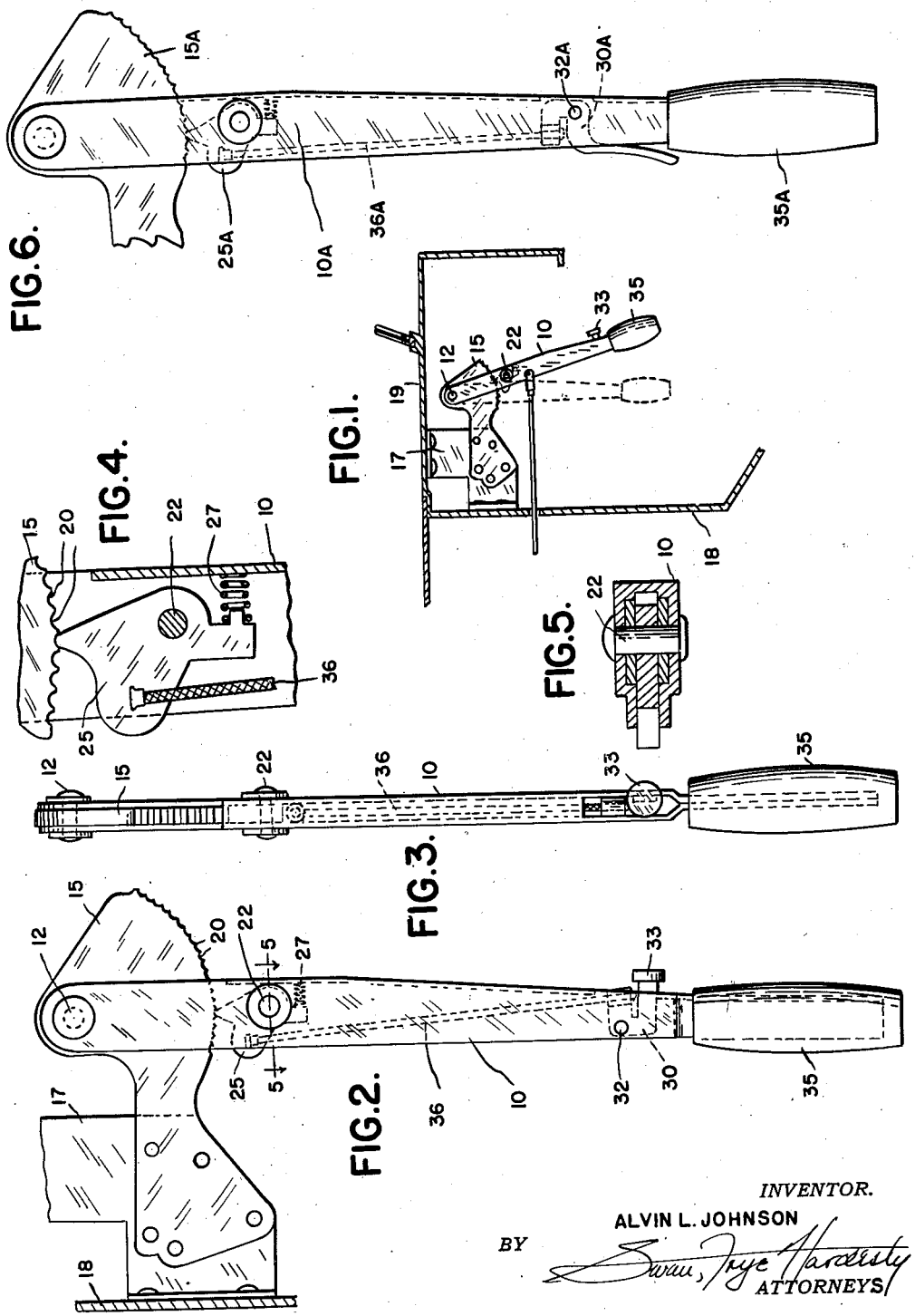
Jan. 14, 1941.  A. L. JOHNSON  2,228,568
HAND LEVER
Filed June 19, 1939
INVENTOR.
ALVIN L. JOHNSON
BY
ATTORNEYS Patented Jan. 14, 1941

UNITED STATES PATENT OFFICE 2,228,568

HAND LEVER

Alvin L. Johnson, Ottawa Hills, Ohio, assignor to American Forging and Socket Company, Pontiac, Mich., a corporation of Michigan Application June 19, 1939, Serial No. 279,858

1 Claim. (Cl. 74—537)

This invention relates to hand lever mechanism for operating remotely controlled apparatus, as for operating the hand or emergency brakes of motor vehicles and the like.

An important object of the invention is to provide a hand brake construction having improved pawl and ratchet means, and improved operating means therefor, the parts being so arranged that the brakes or other mechanism operated by the device are very easily releasable under all conditions, and even when considerable force is exerted on the lever tending to oppose release of the ratchet, as for example, when the brakes or other controlled mechanism are set hard and exert considerable return effort upon the lever.

Another object is to provide such a hand lever mechanism having very few parts, which may be formed largely of inexpensive sheet metal, and all of the parts of which are at all times effectively held against rattling.

Other objects and advantages will be apparent from the following description, wherein reference is made to the accompanying drawing illustrating preferred embodiments of my invention and wherein similar reference numerals designate similar parts throughout the several views.

In the drawing:

Figure 1 is a side elevational view of a hand lever incorporating the principles of this invention, showing the same installed in a motor vehicle, adjacent parts of which are illustrated in section and in fragmentary and diagrammatic manner.

Figure 2 is an enlarged side elevational view of the hand lever.

Figure 3 is an elevation thereof, taken as indicated by the line and arrows 3—3 of Figure 2.

Figure 4 is a sectional detail taken substantially on the line 4—4 of Figure 3, and looking in the direction of the arrows, but on a somewhat larger scale.

Figure 5 is a cross sectional view taken substantially on the line 5—5 of Figure 2, and looking in the direction of the arrows.

Figure 6 is a side elevational view similar to Figure 2, but showing a somewhat modified construction.

Referring now to the drawing, it will be seen that the body of the lever portion 10 is formed of sheet metal and is substantially U-shaped in cross section. The upper end of the lever is pivoted at 12 upon a ratchet plate 15 which is in turn supported by a bracket 17 attached to the dash panel 18 and cowl 19 of the vehicle beneath the instrument panel 16. The hand grip portion 35 projects in a position to be conveniently accessible to the operator.

The ratchet teeth 20 comprise a series of rounded depressions adapted to be engaged by the similarly rounded nose of a sheet metal pawl 25, pivoted between the side webs of the lever 10, upon a pin 22. A spring 27, trapped between the downwardly projecting lower end of the pawl and the interior of the lever, tends to return the pawl to its normal position in which it blocks return movement of the lever by engagement with one of the depressions 20 constituting the ratchet teeth.

The pawl is rockable away from the locked position by means of an operating thumb lever 30 pivoted to the main lever just above the hand grip 35, as upon a pin 32. A button-like thumb piece 33 is attached to the small lever 30, in position to be conveniently engaged by the thumb of the operator. A cable 36 connects the thumb piece to the pawl in such manner that when the button is depressed, the pawl is rocked to the released position.

Due to the shape of the ratchet teeth, and the fact that the pawl when locked extends almost parallel to the main lever, the load is transmitted directly to the body of the ratchet plate, and is not applied to the teeth themselves in a transverse direction, or in any such degree as could cause the teeth to wear to an appreciable extent.

In the somewhat modified construction shown in Figure 6, the hand lever 10A is similar in form, as is also the pawl 25A, operation of the latter, however, being effected by means of a trigger 30A positioned on the opposite side of the hand lever at a point conveniently accessible to the first finger of the operator when grasping the hand grip 35A. The trigger is of course pivoted to swing in the opposite direction, and the operating cable or rod 36A is therefore reversed in its position with respect to pivot of the trigger.

I am aware that the invention may be embodied in other specific forms without departing from the spirit or essential attributes thereof, and I therefore desire the present embodiments to be considered in all respects as illustrative and not restrictive; reference being had to the appended claim rather than to the foregoing description to indicate the scope of the invention.

I claim:

In combination with a hand lever and a ratchet arranged concentrically with the fulcrum of the lever, means for releasably holding the lever against unwanted movement comprising a pawl in the general form of a bellcrank pivoted thereon and having a nose arm extending substantially longitudinally of the lever and swingable to and from holding engagement with the ratchet, and having an actuating arm extending transversely of the lever, said nose arm being rounded at the end, its ratchet having relatively fine teeth connected by complementarily rounded depressions, and the distance between the pivot of the pawl and the ratchet being only slightly less than the effective length of the pawl, whereby the effort exerted on the pawl is transmitted thereby to said depressions rather than to the teeth themselves, and the reactive force acts longitudinally of the lever.

ALVIN L. JOHNSON.